(12) United States Patent
Seidemann et al.

(10) Patent No.: US 12,462,132 B2
(45) Date of Patent: Nov. 4, 2025

(54) ECOLOGICAL MINING USING AT LEAST ONE PRINTING DEVICE FOR PROOF-OF-WORK

(71) Applicant: BASF SE, Ludwigshafen am Rhein (DE)

(72) Inventors: Lothar Seidemann, Ludwigshafen am Rhein (DE); Marie Christin Jahn, Ludwigshafen am Rhein (DE); Holger Kai Peter Jelich, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 122 days.

(21) Appl. No.: 18/281,967

(22) PCT Filed: Mar. 15, 2022

(86) PCT No.: PCT/EP2022/056665
§ 371 (c)(1),
(2) Date: Sep. 14, 2023

(87) PCT Pub. No.: WO2022/194850
PCT Pub. Date: Sep. 22, 2022

(65) Prior Publication Data
US 2024/0305485 A1    Sep. 12, 2024

(30) Foreign Application Priority Data
Mar. 16, 2021 (EP) ...................... 21162922

(51) Int. Cl.
*G06K 15/02* (2006.01)
*G06F 21/64* (2013.01)
(Continued)

(52) U.S. Cl.
CPC ....... *G06K 15/1805* (2013.01); *G06F 21/645* (2013.01); *G06K 15/1878* (2013.01);
(Continued)

(58) Field of Classification Search
CPC ............ G06K 15/1805; G06K 15/1878; G06F 21/645; H04N 1/00005; H04N 1/00047;
(Continued)

(56) References Cited

U.S. PATENT DOCUMENTS

2019/0340369 A1* 11/2019 Hadi ...................... G06V 40/33
2022/0271931 A1    8/2022 Seidemann et al.
(Continued)

FOREIGN PATENT DOCUMENTS

EP    3761556 A1    1/2021
WO   2018/172185 A1   9/2018
WO   2021/001147 A1   1/2021

OTHER PUBLICATIONS

Billings, J., "Image-based Proof of Work Algorithm for the Incentivization of Blockchain Archival of Interesting Images," Retrieved from the Internet on Sep. 19, 2023, URL : https://arxiv.org/abs/1707.04558 , Jul. 14, 2017, pp. 1-30.
(Continued)

*Primary Examiner* — Nicholas Pachol
(74) *Attorney, Agent, or Firm* — Faegre Drinker Biddle & Reath LLP

(57) ABSTRACT

A computer implemented method for proof-of-work for generating and validating a block of a blockchain using at least one printing device is proposed. The printing device is configured for generating at least one digital image depending on a printer control setting. The method comprises the following steps: i) (110) providing an initial digital image (112) comprising a plurality of colored pixels, wherein the
(Continued)

initial digital image (110) is taken from an image database and/or is generated by printing and scanning the initial digital image by using an initial printer control setting; ii) (114) providing a task digital image (116) comprising a plurality of colored pixels different from the initial digital image (112); iii) (118) selecting a mining printer control setting (120), printing the initial digital image (112) by using the printing device by blending pigments with the selected mining printer control setting (120) and scanning the printed image by using at least one scanning device, thereby generating a mining digital image (122) having a plurality of colored pixels different from the initial digital image (112); iv) (124) comparing the colored pixels of the mining digital image (122) and the task digital image (116) by using at least one processing device; wherein the method comprises repeating steps ii) (114) to iv) (124) until the colored pixels of the mining digital image (122) and the task digital image (116) are found to be identical, wherein in each case in step iii) (118) a different mining printer control setting (120) is selected, wherein the mining printer control setting (120) for which the mining digital image (122) and the task digital image (116) are found to be identical is used as the proof-of-work for generating and validating the block of the blockchain.

17 Claims, 5 Drawing Sheets

(51) Int. Cl.
*H04N 1/00* (2006.01)
*H04N 1/21* (2006.01)

(52) U.S. Cl.
CPC ..... *H04N 1/00005* (2013.01); *H04N 1/00047* (2013.01); *H04N 1/00063* (2013.01); *H04N 1/00074* (2013.01); *H04N 1/2166* (2013.01)

(58) Field of Classification Search
CPC ........... H04N 1/00063; H04N 1/00074; H04N 1/2166
See application file for complete search history.

(56) References Cited

U.S. PATENT DOCUMENTS

2024/0193394 A1\* 6/2024 Seidemann ............. G06F 21/64
2025/0023739 A1\* 1/2025 Seidemann ........... H04L 9/3239

OTHER PUBLICATIONS

International Search Report and Written Opinion received for PCT Patent Application No. PCT/EP2022/056665, mailed on Jun. 1, 2022, 11 pages.
European Search Report and Search Opinion received for European Application No. 21162922.5, mailed on Jul. 15, 2021, 6 pages.
Ghosh et al., "A Study on the issue of Blockchain's Energy Consumption", Proceedings of international Ethical Hacking Conference, Nov. 30, 2019, pp. 63-75.
International Preliminary Report on Patentability received for PCT Patent Application No. PCT/EP2022/056665, mailed on Sep. 28, 2023, 8 pages.
Sedlmeir et al., "The Energy Consumption of Blockchain Technology: Beyond Myth", Business & Information Systems Engineering, vol. 62, No. 2, Jun. 19, 2020, pp. 599-560.

\* cited by examiner

ECOLOGICAL MINING USING AT LEAST ONE PRINTING DEVICE FOR PROOF-OF-WORK

CROSS-REFERENCE TO RELATED APPLICATIONS

This application is a National stage application (under 35 U.S.C. § 371) of PCT/EP2022/056665, filed Mar. 15, 2022, which claims benefit of European Application No. 21162922.5, filed Mar. 16, 2021, both of which are incorporated herein by reference in their entirety.

TECHNICAL FIELD

The invention relates to a computer implemented method for proof-of-work for generating and validating a block of a blockchain using at least one printing device, and a use of said method for trading crypto currency. The method and uses according to the present invention specifically may be used for secured processing of transactions in the fields of smart contracts, financial services, healthcare, personal identification, cryptocurrencies, supply chain. Other applications are possible.

BACKGROUND ART

In many applications, such as in the fields of financial services, healthcare, personal identification, cryptocurrencies, supply chain and others, the blockchain technology is an efficient technology to ensure the secured processing of transactions such as of licensing, cooperation with other companies and selling technology.

A blockchain is a growing list of records, called blocks, that are linked using cryptography. Each block contains a cryptographic hash of the previous block, a timestamp, and transaction data. By design, a blockchain is resistant to modification of the data. It is "an open, distributed ledger that can record transactions between two parties efficiently and in a verifiable and permanent way", see en.wikipedia.org/wiki/Blockchain. For use as a distributed ledger, a blockchain is typically managed by a peer-to-peer network collectively adhering to a protocol for inter-node communication and validating new blocks. Each block includes the cryptographic hash of the prior block in the blockchain, linking the two. The linked blocks form a chain. This iterative process confirms the integrity of the previous block, all the way back to the original genesis block. The blockchain technology typically requires a cryptographic hash function, multiple information needs to be processed and a Hash function to map data of arbitrary size to fixed-size values such that the data in any given block cannot be altered retroactively.

Eshani et al, "A study on the issue of blockchain's energy consumption", DOI: 10.1007/978-981-15-0361-0_5, describe that blockchain technology is one of the biggest innovative technology that has been developed and has potential usage in fields of education, business and industries. Since the creation of bitcoins, blockchain has emerged as a means for storing digital information without the intervention of any third parties. However, now it is used for various other applications than just being a simple distributed ledger. With time it has imposed a larger impact an different fields of economy and has gained popularity for its immutability. But, there are some issues faced by blockchain. One of such issues is the energy consumption. Blockchains are found to consume exorbitant amount of energy because of the algorithm followed for its creation. Johannes Sedlmeir et al., "The Energy Consumption of Blockchain Technology: Beyond Myth", Bus Inf Syst Eng 62(6): 599-608 (2020), https://doi.org/10.1007/s12599-020-00656-x and Eshani Ghosh and Baisakhi Das, "A study on the issue of blockchain's energy consumption", January 2020, DOI: 10.1007/978-981-15-0361-0_5, Proceedings of International Ethical Hacking Conference 2019 (pp. 63-75), describe enormous energy consumption needed for blockchain technology, in particular for proof-of-work.

Despite the achievements of known blockchain technology and methods for generating blockchains, in particular in view of recent progress in computer technology, increasing availability of computer power and resources, there is still a need for reducing the energy consumption for the blockchain technology, in particular required for proof-of-work.

WO 2018/172185 A1 describes a communication method, comprising receiving or generating, by a first communication terminal, a proof-of-work test, the proof-of-work test being compliant to a proof-of-work protocol agreed upon within a network comprising, at least, the first communication terminal and a second communication terminal. The method further comprises producing a proof-of-work associated with the proof-of-work test by solving the proof-of-work test according to a privileged-user strategy. The privileged-user strategy comprises a meet-in-the-middle search using a secret key associated with the proof-of-work test. In addition, the method comprises transmitting, broadcasting or multicasting the produced proof-of-work on the network for verification of the produced proof-of-work by the second communication terminal.

PROBLEM TO BE SOLVED

It is therefore desirable to provide methods and devices, which address the above-mentioned technical challenges. Specifically, a computer implemented method for proof-of-work for generating and validating a block of a blockchain using at least one printing device and a use for trading crypto currency shall be provided, which allow for reducing the energy consumption for proof-of-work.

SUMMARY

This problem is addressed by a computer implemented method for proof-of-work for generating and validating a block of a blockchain using at least one printing device and a uses with the features of the independent claims. Advantageous embodiments which might be realized in an isolated fashion or in any arbitrary combinations are listed in the dependent claims.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

In a first aspect of the present invention, a computer implemented method for proof-of-work for generating and validating a block of a blockchain using at least one printing device is proposed. The printing device is configured for generating at least one digital image depending on a printer control setting.

The method comprises the following method steps which, specifically, may be performed in the given order. Still, a different order is also possible. It is further possible to perform two or more of the method steps fully or partially simultaneously. Further, one or more or even all of the method steps may be performed once or may be performed repeatedly, such as repeated once or several times. Further, the method may comprise additional method steps which are not listed.

The method comprises the following steps:
i) providing an initial digital image comprising a plurality of colored pixels, wherein the initial digital image is taken from an image database and/or is generated by printing and scanning the initial digital image by using an initial printer control setting;
ii) providing a task digital image comprising a plurality of colored pixels different from the initial digital image;
iii) selecting a mining printer control setting, printing the initial digital image by using the printing device by blending pigments with the selected mining printer control setting and scanning the printed image by using at least one scanning device, thereby generating a mining digital image having a plurality of colored pixels different from the initial digital image;
iv) comparing the colored pixels of the mining digital image and the task digital image by using at least one processing device;
wherein the method comprises repeating steps ii) to iv) until the colored pixels of the mining digital image and the task digital image are found to be identical, wherein in each case in step iii) a different mining printer control setting is selected, wherein the mining printer control setting for which the mining digital image and the task digital image are found to be identical is used as the proof-of-work for generating and validating the block of the blockchain.

The term "computer-implemented" as used herein is a broad term and is to be given its ordinary and customary meaning to a person of ordinary skill in the art and is not to be limited to a special or customized meaning. The term specifically may refer, without limitation, to a process which is fully or partially implemented by using a data processing means, such as data processing means comprising at least one processor. The term "computer", thus, may generally refer to a device or to a combination or network of devices having at least one data processing means such as at least one processor. The computer, additionally, may comprise one or more further components, such as at least one of a data storage device, an electronic interface or a human-machine interface.

The term "block", as used herein is a broad term and is to be given its ordinary and customary meaning to a person of ordinary skill in the art and is not to be limited to a special or customized meaning. The term specifically may refer, without limitation, to a component or an element of the blockchain. Blockchains can be defined as a chain of blocks which can hold certain records and the blocks are linked to one another using the principles of cryptography, for further details see "Eshani et al, "A study on the issue of blockchain's energy consumption", Chapter 2, DOI: 10.1007/978-981-15-0361-0_5 or en.wikipedia.org/wiki/Blockchain. Each block may comprise transaction data. The blocks may be linked by comprising the hash value of the previous block. Each block comprises a cryptographic hash of the previous block. Each block may further comprise a timestamp. The blockchain may comprise a plurality of linked blocks.

The term "generating a block" as used herein is a broad term and is to be given its ordinary and customary meaning to a person of ordinary skill in the art and is not to be limited to a special or customized meaning. The term specifically may refer, without limitation, to adding and/or producing and/or creating a new block to the blockchain. The term "proof-of-work" as used herein is a broad term and is to be given its ordinary and customary meaning to a person of ordinary skill in the art and is not to be limited to a special or customized meaning. The term specifically may refer, without limitation, to a consensus process for securing generation of new blocks of the blockchain. Before a block can be added to the blockchain, information contained by the block needs to be "validated" by a network built on blockchain technology, also denoted as blockchain network. This is may be done by creating a so-called hash by solving a cryptographic puzzle. A participating node of the network, the so-called miner, may have a right to generate a new block when it found, in particular as the first, the solution to the cryptographic puzzle. The process of searching for the solution is usually called "mining" or "mining process". The other nodes of the network may check if the found solution is correct. If the other nodes confirm its validity, the block is considered validated and can be added to the blockchain.

The term "printing device", also denoted as printer, as used herein is a broad term and is to be given its ordinary and customary meaning to a person of ordinary skill in the art and is not to be limited to a special or customized meaning. The term specifically may refer, without limitation, to a device configured for applying, e.g. printing, at least one material onto at least one printing surface or substrate, specifically in a patterned fashion, according to the printer control setting. In particular, the printing device may comprise one or more of a drum, such as an image drum; a laser, a lens system, such as a lens system comprising at least one mirror, e.g. a rotatable mirror; a cleaning element, such as a roll, a scraper or similar means for cleaning, e.g. for cleaning the drum; a cassette, e.g. for storing one or more of the substrate, such as a paper cassette; at least one transporting element, such as a roller and/or conveyor, e.g. for feeding, transferring and/or ejecting the substrate, specifically the paper, into, within and/or from the printing device; a printer control unit configured for controlling the printing device.

Specifically, the printing device is configured for generating the at least one digital image. The term "digital image", also denoted digital picture, as used herein is a broad term and is to be given its ordinary and customary meaning to a person of ordinary skill in the art and is not to be limited to a special or customized meaning. The term specifically may refer, without limitation, to a two-dimensional representation of the physical object. The terms image and picture are used in the following as synonyms. The digital image may comprise a plurality of colored pixels. For example, the digital image may be a digital RGB image. The digital RGB image may be a color digital image having three color channels, i.e. one for red (R), one for green (G) and one blue (B). The primary colors of the digital RGB image may be red, green and blue. The RGB digital image may have a color channel for each primary color. The digital color image may comprise a plurality of image pixels, wherein each image pixel is made of combinations of the primary colors. For example, the digital RGB image may be 24-bit or 48-bit. Each pixel of the digital RGB image may be specified by two spatial coordinates and three color values. For example, the digital image may be a digital CMYK color image, wherein the primary colors of the CMYK color space are black, cyan, magenta, yellow and white. However, other color spaces are possible.

The term "printer control setting" as used herein is a broad term and is to be given its ordinary and customary meaning to a person of ordinary skill in the art and is not to be limited to a special or customized meaning. The term specifically may refer, without limitation, to printer control information comprising a plurality of parameters for controlling at least one function of the printing device. For example, the printer control setting may comprise a string of characters of a pre-defined length. The printer control setting may comprise at least one item of blending information, which will be outlined in more detail below. Thus, typically, the printing device may be configured for generating text and/or images on the at least one printing surface according to the printer control setting, such as one or more of a string of characters, a bitmapped image, a vector image, a computer program, e.g. provided in at least one printer control language. In particular, the printing device, specifically at least one function of the printing device, may be controllable via at least one printer control language, such as one or more page description languages (PDLs), printer command languages (PCLs), PostScript, XML Paper Specification and the like.

The term "generating at least one digital image" as used herein is a broad term and is to be given its ordinary and customary meaning to a person of ordinary skill in the art and is not to be limited to a special or customized meaning. The term specifically may refer, without limitation, to a process of determining the color of pixels of the digital image. Specifically, the generating of the digital image may comprise blending pigments, in particular colored pigments, based on the printer control setting by using the printing device and scanning the blended pigments, in particular by using at least one scanning device such as of the printing device. With respect to embodiments of the printing device and the blending reference is made to WO 2021/001147, the full content is included herein by reference. The present invention takes the advantage of using the high entropy of solid particle bulks when they are blended. Especially, applying colored pigments for performing the blending of solid particle bulks, was found as effective way to analyze the physical results due the optical principle. Especially, the most significant part of energy consumption for the "proof-of-work" is proposed to be transferred to the physical process of blending. Performed by and/or done in the printing device, the blending may require only a very small amount of energy. Hence, the mining process is transferred to printing, where the miner needs to find an individual printer control setting to generate a dedicated image for each block. The binary code of the printer control setting may be transferred into a decimal number string known as a nonce from the digital mining. Substituting the "proof-of-work" by blending of pigments in a printing device may reduce the electrical energy consumption, for example in case of using natural pigments by 99%, in comparison to publicly available data for the Bitcoin blockchain technology. Thus, the present invention may allow a significant contribution to reduce costs and $CO_2$ emission as most of the electrical energy is not from renewable sources.

The term "initial digital image" as used herein is a broad term and is to be given its ordinary and customary meaning to a person of ordinary skill in the art and is not to be limited to a special or customized meaning. The term specifically may refer, without limitation, to an arbitrary digital image used as a starting point for mining. The initial digital image may be taken from an image database and/or is generated by printing and scanning the initial digital image by using an initial printer control setting. The image database may be comprised by the printing device and/or may be an external database. The initial digital image may be a task digital image or mining digital image used for generating and validating the previous block. The term "providing" the initial digital image, as used herein is a broad term and is to be given its ordinary and customary meaning to a person of ordinary skill in the art and is not to be limited to a special or customized meaning. The term specifically may refer, without limitation, to generating the initial digital image or retrieving the initial digital image. The generating of the initial digital image may comprise blending pigments, in particular colored pigments, based on the initial printer control setting by using the printing device and scanning the blended pigments, in particular by using at least one scanning device such as of the printing device. Additionally or alternatively, the initial digital image may be generated by digital scanning of a physical object. The physical object may be an arbitrary physical object. For example, the physical object may be a blend, a painting, a building, a plant and the like.

The term "initial printer control setting" as used herein is a broad term and is to be given its ordinary and customary meaning to a person of ordinary skill in the art and is not to be limited to a special or customized meaning. The term specifically may refer, without limitation, to an arbitrary printer control setting used as starting point for mining. The initial printer control setting may be the printer control setting used for generating and validating the previous block.

Step i) may comprise changing of colors while printing of the initial digital image. The changing of color may comprise changing of colors of the color dots. The changing of colors of the color dots may comprise placing of pigments of another color on the substrate than the pigments to be placed according to the original color of the initial digital image. For example, a given color dot of yellow pigments may become a color dot of cyan pigments in the CMYK color space. The term "task digital image" as used herein is a broad term and is to be given its ordinary and customary meaning to a person of ordinary skill in the art and is not to be limited to a special or customized meaning. The term specifically may refer, without limitation, to an arbitrary digital image used as cryptographic puzzle. The task digital image comprises a plurality of colored pixels different from the initial digital image. The task digital image may be generated by using at least one random algorithm. Such random algorithms are generally known to the skilled person. The random numbers such as hexadecimal numbers generated by the random algorithm may be converted into color values. The conversion of the hexadecimal numerals into the color values may be performed using at least one mathematical algorithm and/or at least one pre-determined relationship such as a look-up table, e.g. as described in "Improving Image Performance by Using Color Lookup Tables, Adobe developer support, Technical Note #5121, 31 Mar. 1992 or https://www.rgbtohex.net/hextorgb/. Additionally or alternatively, the task digital image may be provided by transforming digital information of transaction of a block, such as of the block to be added or of a previous block, e.g. in RGB colors or CMYK colors. The transaction may comprise financial transactions such as payments, licensing, orders, invoices, and/or logistic transactions such as deliveries, storage records, travel records, and/or transactions relating to plans, and/or tax declarations, and/or contracts, and/or personal health information and the like. The term "digital information of transaction" as used herein is a broad term and is to be given its ordinary and customary meaning to a person of ordinary skill in the art and is not to be limited to a special or customized meaning. The term specifically may refer, without limitation, to data describing at least one transaction, also denoted as transaction data. The transaction data may comprise information about one or more of time of transaction, a numerical value of the transaction a text of the transaction, a digital picture of the transaction, a text of the transaction, a digital image of the transaction and the like. The transaction data may be provided in binary format.

The colored pixels of the initial digital image and/or the task digital image may be colored pixels of CMYK color space, wherein the primary colors of the CMYK color space are black, cyan, magenta, yellow and white. However, other color spaces such as RGB may be possible. The term "mining printer control setting" as used herein is a broad term and is to be given its ordinary and customary meaning to a person of ordinary skill in the art and is not to be limited to a special or customized meaning. The term specifically may refer, without limitation, to the printer control setting assumed to be used for generating the task digital image. The mining printer control setting may be selected iteratively, in particular when repeating step iii). For example, the mining printer control setting may be selected to adjust the color pixelwise and/or for a group of pixels. For example, the mining printer control setting may comprise a character string, wherein the characters of the character string, such as numbers, may be changed iteratively, e.g. the numbers of the character string may be incremented, such as by one, when selecting the next mining printer control setting. The mining printer control setting may be selected by one or more of at least one cloud service, at least one processing device of a node of the blockchain network, or the like. For example, each of the nodes may be configured for execute a software program configured for selecting the mining printer control setting.

The mining digital image has a plurality of colored pixels different from the initial digital image. The colored pixels of the mining digital image may be colored pixels of CMYK or RGB colors space.

The term "mining digital image" as used herein is a broad term and is to be given its ordinary and customary meaning to a person of ordinary skill in the art and is not to be limited to a special or customized meaning. The term specifically may refer, without limitation, to a digital image being generated by printing the initial digital image by using the printing device by blending pigments with the selected mining printer control setting and scanning the printed image by using at least one scanning device. The blending may comprise at least one process of mixing pigments in a defined manner, thereby creating a blend. The printing device may be configured for use as a blending device. Specifically, the printing device is configured for receiving the at least one item of blending information and for generating the digital image. The printing device may specifically be configured for blending at least two materials according to the at least one item of blending information onto at least one substrate. In particular, the printing device may be configured for blending the at least two materials according to the item of blending information, thereby e.g. generating the blend, onto a substrate for receiving the blend. With respect to embodiments of the printing device and the generating of the encryption key reference is made to WO 2021/001147, the full content is included herein by reference.

The term "material" as used herein is a broad term and is to be given its ordinary and customary meaning to a person of ordinary skill in the art and is not to be limited to a special or customized meaning. The term specifically may refer, without limitation, to a chemical element or a chemical compound, specifically a chemical element or a chemical compound being capable of mixing with other chemical elements or chemical compounds. The material specifically may be suitable for pouring. The material generally may be in one or more of a solid state, specifically a granular solid state, a liquid state or a gaseous state. Specifically, the material may be or may comprise at least one of a powder or a liquid. The material may be a homogeneous, unitary material. Alternatively, the material may also comprise a plurality of components which are mixed homogeneously or inhomogeneously. Thus, the material may be a mixture or a composite by itself. As an example, the material may be or may comprise a liquid, wherein the liquid, as an example, comprise at least one solvent and at least one chemical compound dissolved, emulsified or dispersed in the at least one solvent. The solvent may form part of the material, or, alternatively, the at least one chemical compound may be considered the material, whereas the solvent may simply be considered as an adjuvant or additive to the material.

The term "blending" as used herein is a broad term and is to be given its ordinary and customary meaning to a person of ordinary skill in the art and is not to be limited to a special or customized meaning. The term specifically may refer, without limitation, to the process of mixing the at least two materials in a defined manner, thereby creating a blend. The terms blending and mixing will be used interchangeable herein. The process of creating the blend may include further steps such as temperature changes or temperature treatments of the at least two materials. The mixing take place in various ways, in accordance with the nature of the at least two materials. As an example, in case the at least two materials comprise powders, the mixing may involve co-dispensing or subsequently dispensing the powders into a common receptacle, including the option of stirring the mixture. Additionally or alternatively, in case the at least two materials comprise liquids, the mixing may also involve co-dispensing or subsequently dispensing the liquids into a common receptacle, including the option of stirring the mixture. Additionally or alternatively, as will be outlined in further detail below, the mixing may also comprise printing processes, e.g. inkjet printing of the at least two materials, e.g. onto a common substrate. Additionally or alternatively, the blending may comprise other types of mixing processes of the at least two materials, such as mixing the at least two materials on at least one common substrate. As an example, the blending may comprise one or more electrostatic precipitation processes, such as electrostatic precipitation of the at least two materials, e.g. onto a common substrate, e.g. onto an electrostatic charged surface. Thus, specifically, the blending and/or mixing may comprise electrostatic precipitation in printing processes. For example, the blending and/or mixing may comprise electrostatic precipitation in printing processes of at least two electrostatic charged materials onto an electrostatic neutralized surface. Thus, the materials may be mixed, thereby at least temporarily changing their electrical charges. Specifically, the blending and/or mixing may comprise electrostatic precipitation in laser printing processes, such as processes typically performed in a laser printer. In particular, the at least two materials, e.g. the pigments, may for example firstly be electrostatically charged and deposited on an equally charged image roll where specific areas have been electrostatically neutralized, e.g. by using a laser and/or LED. These deposited materials may, as an example, then be drawn and/or removed off the image roll by a reversely charged substrate, such as by a reversely charged paper.

The blending may leave the materials unchanged or may also fully or partially change the nature of the materials. Thus, as an example, the materials may simply be mixed without any chemical changes. Additionally or alternatively, the materials may be mixed, thereby changing their chemical nature. The latter specifically may take place in case the materials contain solvents which, during the blending or afterwards, may fully or partially evaporate. Again, additionally or alternatively, the materials may also fully or partially react with each other, thereby generating at least one reaction product.

The term "blend" as used herein is a broad term and is to be given its ordinary and customary meaning to a person of ordinary skill in the art and is not to be limited to a special or customized meaning. The term specifically may refer, without limitation, to a mixture of the at least two materials. The mixture specifically may be present in at least one receptacle and/or on at least one substrate. The mixture generally may be in one or more of a solid state, specifically a granular solid state, a liquid state or a gaseous state. Specifically, the mixture may be or may comprise at least one of a powder or a liquid. The mixture may be in the same state as the materials or may be in a different state. As an example, at least one of the materials may be in a liquid state, wherein the mixture may also be in a solid state, which may be the case e.g. after a drying process. Thus, as an example, the at least two materials may be mixed in the blending process in a liquid state, wherein, afterwards, a drying may take place, thereby evaporating at least one solvent and/or thereby changing the chemical nature of the mixed materials. As an example, the mixing process may imply a printing of the at least two materials in a liquid state onto at least one substrate, followed by a drying or setting process, wherein the blend, consequently, may be in a dried or solid state. Other examples may imply a phase change process, such as a curing or a solidifying of the materials after mixture.

The term "item of blending information" as used herein is a broad term and is to be given its ordinary and customary meaning to a person of ordinary skill in the art and is not to be limited to a special or customized meaning. The term specifically may refer, without limitation, to at least one item of information describing a defined blending process. The at least one item of blending information may refer to the process of blending itself, such as to the way the at least two materials are mixed, e.g. to process parameters of the mixing process. Additionally or alternatively, the at least one item of blending information may also refer to the materials for blending, such as to quantities to be mixed in the blending process, e.g. to masses or volumes of the materials.

The term "blending device" as used herein is a broad term and is to be given its ordinary and customary meaning to a person of ordinary skill in the art and is not to be limited to a special or customized meaning. The term specifically may refer, without limitation, to a device which is configured for performing the above described blending process. Specifically, as will also be outlined in further detail below, the blending device may comprise at least one of a feed or a reservoir for each of the materials. The blending device may also comprise at least one blending element, such as at least one of a nozzle, a stirring device, a printer, a mixer or the like.

Consequently, the term "blend" as used herein is also a broad term and is to be given its ordinary and customary meaning to a person of ordinary skill in the art and is not to be limited to a special or customized meaning. The term specifically may refer, without limitation, to a mixture of at least two materials. The blend specifically may be present on a substrate or in a receptacle. The blend specifically may comprise a finite amount of the materials.

The generating of the mining digital image may comprise detecting at least one material property of the blend by using at least one detector. The term "material property" as used herein is a broad term and is to be given its ordinary and customary meaning to a person of ordinary skill in the art and is not to be limited to a special or customized meaning. The term specifically may refer, without limitation, to an arbitrary property of a material, such as of the blend. The property specifically may refer to one or more of a physical, a chemical or a biological property. Specifically, the material property may comprise at least one of a mechanical property or an optical property of the material. The material property specifically may refer to a measurable property of the respective material. More specifically, the at least one material property may be or may comprise at least one color of the blend. Additionally or alternatively the at least one property selected from the group consisting of: a specific density of the blend; a volume of the blend; a weight of the blend; an optical property of the blend; a spectral composition of the blend, specifically a color spectrum of the blend; a color intensity of the blend; a viscosity of the blend. Other material properties may be used alternatively or additionally.

The step of detecting the at least one material property of the blend specifically may comprise generating at least one item of measurement information on the material property. Thus, the at least one item of measurement information may generally refer to the result of a measurement of the at least one material property, such as to at least one numerical measurement value indicating the at least one material property of the blend or being characteristic for the at least one material property of the blend. Thus, as an example, the at least one item of measurement information may, as an example, comprise at least one of the following items of information: a specific density measurement value of the blend; a volume measurement value of the blend; a weight measurement value of the blend; an optical property measurement value of the blend; a color measurement value of the blend; a spectral composition measurement value of the blend, specifically a color spectrum measurement value of the blend; a color intensity measurement value of the blend; a viscosity measurement value of the blend. These measurement values might as an example each may be or may comprise a single number or a plurality of numbers, such as distributions, spectra or the like. Specifically, the at least one item of measurement information may be or may comprise at least one numerical value such as a digital value.

The term "detecting" as used herein is a broad term and is to be given its ordinary and customary meaning to a person of ordinary skill in the art and is not to be limited to a special or customized meaning. The term specifically may refer, without limitation, to the process of generating information on a property or measurable variable, wherein qualitative and/or quantitative information may be retrieved. The term specifically may refer to the process of measuring at least one measurable variable of the physical object. Consequently, the term "detector" as used herein is a broad term and is to be given its ordinary and customary meaning to a person of ordinary skill in the art and is not to be limited to a special or customized meaning. The term specifically may refer, without limitation, to an arbitrary device configured for performing the detecting process, such as a device having at least one sensor for measuring the at least one measurable variable of the object. As an example, the sensor may comprise one or more of: a weight sensor, specifically a scale; a volume sensor; a density sensor; a color sensor; a particle size distribution sensor. Other sensors may be used in addition or alternatively.

The at least one item of blending information specifically may comprise n blending variables, wherein n denotes a positive integer. The term "blending variable" as used herein is a broad term and is to be given its ordinary and customary meaning to a person of ordinary skill in the art and is not to be limited to a special or customized meaning. The term specifically may refer, without limitation, to a variable which either quantitatively or qualitatively describes at least one aspect or parameter of the blending. As an example, the blending variable may refer to the at least two materials, to detect of the blending process such as quantities or material streams for mixture or the like. Further, m material properties of the blend may be detected, with m being a positive integer. Specifically, the number m of material properties detected may be as large or larger than the number n of blending variables. In other words, preferably, m≥n. In still other words, specifically, the information generated by the detection may be at least as large as the information used for the generating of the blend, wherein the term "information" may refer to the numbers n and m, respectively, and/or may generally refer to the number of degrees of freedom and/or to the logarithm of the degrees of freedom, such as log n or log m, respectively.

The at least two materials blended specifically may be different materials, specifically materials being different with respect to at least one property selected from the group consisting of: a chemical property, specifically a chemical composition; an optical property, specifically an optical appearance such as one or more of a color, a transparency, a brilliance; a mechanical property, specifically one or more of granularity, particle size, density, viscosity or flowing properties; an electrostatic chargeability; a compressibility; a crystallinity; a particle shape. Still, additionally or alternatively, other properties may be used.

The at least two materials specifically may comprise bulk materials and/or loose materials. The at least two materials, independently, each may be selected from the group consisting of solid materials, gaseous materials and liquid materials. More specifically, the at least two materials, independently, may be selected from the group consisting of and/or may comprise at least two materials selected from the group consisting of:

a powder, specifically a powder selected from the group consisting of:
an inorganic powder, specifically an inorganic powder made of a mineral;
an organic powder, specifically an organic powder made of a polymer;
a pigment;
a toner powder;
a liquid, specifically a liquid selected from the group consisting of a pure liquid, a suspension, an emulsion or a solution, more specifically one or more of a liquid color and an ink.

The term material and pigment may be used herein as synonyms. Thus, the term pigment may comprise a color particle, a powder, a liquid comprising these particles. The term pigment may comprise pure pigments and/or pigments having at least one polymer coating, e.g. of styrene acrylate copolymer, polyester resin, styrene butadiene copolymer, or similar polymers. Specifically, the term pigment may refer to toner powders. In the context of the present invention, any suitable pigment can be used. It is also possible to use mixtures of one or more pigments or toner powders of one or more pigments in the context of the present invention.

In the context of the present invention, the amount of the pigments used may vary. Preferably, the amount of pigments used is in the range of from $10^{-15}$ g/cm$^2$ to 1 g/cm$^2$, more preferable in the range of from $10^{-9}$ g/cm$^2$ to $10^{-3}$ g/cm$^2$.

The particle size of the pigments used preferably is in the range of from 10 nanometer to 1 mm, preferably, in particular in the range of from 100 nanometer to 100 micrometer.

Preferably, suitable pigments are selected from inorganic materials, preferably from metal oxides, metal oxides, preferably metal oxides from natural sources. Suitable may for example be pigments selected from iron oxides. Iron oxide pigments are relatively low-cost materials that resist color change due to exposure to sunlight, have good chemical resistance and are stable under normal ambient conditions. It has been found that iron oxides are particularly suitable since the materials can easily be recycled and reused. Iron oxide pigments can for example be collected and can be used as feedstock for steel production leading to the avoidance of disposal of used pigment as waste.

Suitable iron oxides are also available as natural pigments. Suitable red pigments may be derived from hematite, yellow and brown pigments, such as ochres, sierras and umbers, may be derived from limonite, and magnetite provides a black iron oxide pigment. Furthermore, synthetic pigments, in particular metal oxides such as iron oxides, which are manufactured under controlled conditions such that particle size, distribution and shape resulting in superior uniformity, may be used according to the present invention to improve color quality and chemical purity.

For example, pigments from natural sources are suitable for the method of the present invention such as pigments selected from natural organic materials, for example organic material from plants, animals, and minerals. Also suitable are pigments selected from synthetic organic materials such as for example azopigments. Suitable mineral pigments are for example ochre, sienna, azurite, cobalt or ultramarine. Also spinels may be used. Ochre is usually a red or yellow that is obtained from ore of iron or ferruginous clay. Sienna is a form of limonite clay that is derived from ferric oxides to produce a rich red. Azurite is found in the upper oxidized portions of copper ore deposits. Ultramarine can be obtained from lapis lazuli or can be artificially manufactured. Spinels are available in yellow, orange, turquoise, and blue. Further examples include: carmine lake natural red 4 (cochineal), natural yellow 3 lake (from plants), madder lake natural red 9 (madder root), indigo lake natural blue 2 (woad), chlorophylin green lake (plant matter), vegetable or bone black, titanium white, iron oxides, talc, chalk, kaolin and other earth pigments.

According to a further embodiment of the present invention, preferably at least 20%, more preferably 30%, and most preferably 40%, of the pigments used should be of natural origin, i.e. derived from natural products, other than products of the petrochemical industry, by simple separation or purification steps. Other embodiments are possible, too. For example, 100% of the pigments used can be of natural origin.

In the context of the present invention the term pigments also comprises pigments which are visible under UV light. Sustainable and eco friendly materials may be used such as pigments from Clariant available under the Ecotrain label, for example pigments selected from the group of Novoperm Yellow HR 72, Hostaperm Blue B2G 03, Hostaperm Green GNX 01, Hansa Brilliant Yellow 2GX 72-S, Hostaperm Yellow H3G EDW VP 5131 Novoperm Orange HL 71, and Hostaperm Blue B2G-EDS VP 3491.

In the context of the present invention, it is also possible to use effect pigments such as for example absorption pigments, metal effect pigments, and pearlescent pigments. Metal effect pigments or metallic effect pigments usually consist of flakes or platelets of aluminum, copper, copper-zinc alloys, zinc and other metals. Suitable pearlescent pigments are for example mica-based pigments, but also pigments based on silica or alumina flakes. Suitable are for example pigments of natural mica coated with thin films of metal oxides such as $TiO_2$ or iron oxide. Furthermore, pigments based on silica flakes ($SiO_2$) or alumina ($Al_2O_3$) based pigments can be used in the context of the invention. Suitable substrate-free pearlescent pigments are for example natural pearl essence, basic lead carbonate, bismuth oxychloride, micaceous iron oxide and $TiO_2$ flakes.

In particular the energy consumption can be enhanced if the pigments described above, such as "natural pigments", are used which do not require the energy input to perform the chemical synthesis. Using natural pigments in a printer may reduce the electrical energy consumption by 99% compared to publicly available data for the Bitcoin blockchain technology, see publications above. Thus, the present invention provides a significant contribution to reduce costs and $CO_2$ emission as most of the electrical energy is not from renewable sources.

The blending of the at least two materials may be performed according to at least one item of blending information. The at least one item of blending information specifically may comprise at least one of: quantities for the at least two materials to be blended; weights for the at least two materials to be blended; volumes of the at least two materials to be blended; a blending ratio of volumes of the at least two materials to be blended; a blending ratio of weights of the at least two materials to be blended; mixing instructions for mixing two or more continuous or discontinuous streams of the at least two materials to be blended; printing instructions for blending the at least two materials to be blended, such as a tilting information for blending the at least two materials to be blended using differently tilted raster images, e.g. raster images generated by a raster image processor (RIP) of a printer. Still, additionally or alternatively, other types of blending information may also be used.

The at least two materials may be fed into the blending device continuously or discontinuously. Thus, as an example, the blending device may comprise at least two reservoirs for the at least two materials to be blended. Additionally or alternatively, however, other means of feeding the materials into the at least one blending device are also possible. Thus, as an example, a continuous feeding is also possible, in addition or alternatively to using at least one reservoir for at least one of the materials.

The blending device may further comprise at least one receiving element for receiving the blend. As used herein, the term "receiving element" may generally refer to an arbitrary element configured for receiving the blend. The receiving element specifically may have at least one receiving surface and/or at least one receiving material for receiving the blend. Thus, as an example, the at least one receiving element specifically may comprise at least one element selected from the group consisting of: a receiving vessel for receiving the blend; a substrate for receiving the blend. The at least one receiving element may be a stationary receiving element and/or maybe a moving receiving element, such as a rotatable receiving element. As an example, the receiving element may comprise at least one substrate, such as a substrate having at least one substrate surface which may be or may comprise a planar substrate surface and/or which may be or may comprise a curved substrate surface. As an example, the receiving element may comprise at least one drum having a receiving surface for receiving the blend, such as a rotating drum. The blend, by using the blending device, specifically may be deposited directly or indirectly on to the rotating drum. As an example, a drum may be used on which the blend is temporarily secured, such as electrostatically. These electrostatic drums are generally known in the technical field of printing, such as laser printing.

In case the receiving element comprises at least one drum, the drum specifically may be a rotating drum. Therein, the method may further comprise at least one cleaning step in which, after detecting the at least one material property, the blend specifically may be removed from the receiving surface of the drum. As an example, powders and/or pigments may be dispensed onto a rotating drum and may be, as an example, temporarily secured to the surface of the rotating drum by electrostatic forces. During that time of securing the blend to the surface of the rotating drum, the at least one material property of the blend on the surface might be detected, e.g. by optical reading. As an example and as will be outlined in further detail below, colors may be detected and, subsequently, may, as an example, be transformed into binary information, such as a binary row of numbers. Subsequently, the drum may be cleaned, such as by rotating into a cleaning position, e.g. by rotating the drum by 90°.

A similar procedure, optionally without the securing by electrostatic forces, may also be performed by using inkjet printing, either directly onto the surface of a drum and/or onto a moving substrate, such as onto a paper substrate. The drum, after detecting the at least one property, may be cleaned for reuse. Thus, as an example, the blending device may comprise at least one inkjet printer. The materials may be or may comprise inkjet printing of the materials, which may be or may comprise liquid materials, onto the at least one receiving element, such as onto the at least one rotating drum and/or onto at least one substrate. Subsequently, the detection of the at least one material property may take place, such as of the at least one optical property, e.g. by optical reading. As an example, again, colors may be detected and, subsequently, may, as an example, be transformed into binary information, such as a binary row of numbers. Subsequently, the drum may be cleaned, such as by rotating into a cleaning position, e.g. by rotating the drum by 90°. Additionally or alternatively, besides cleaning the at least one receiving element, a new receiving element or a new part of the receiving element may be used for further steps, such as for further printing and for repeating the blending and the detecting.

The blending device specifically may comprise at least one blending element for generating the blend. The term "blending element" as used herein is a broad term and is to be given its ordinary and customary meaning to a person of ordinary skill in the art and is not to be limited to a special or customized meaning. The term specifically may refer, without limitation, to an arbitrary element, device or combination of elements configured for blending the at least two materials, specifically by mixing the at least two materials, e.g. before, during or after deposition onto the at least one optional receiving element. As an example, the at least one blending element may be or may comprise at least one element selected from the group consisting of: a dispenser for continuously or discontinuously dispensing at least one of the two materials; a printer for printing the at least two materials onto at least one receiving element, specifically onto at least one substrate, specifically at least one printer selected from the group consisting of: an inkjet printer, a laser printer. Still, additionally or alternatively, other types of blending elements may be used. Thus, as an example, the blending element may be or may comprise at least one of a stirring element, a dispenser, a nozzle, an extruder.

The printer may specifically be configured for blending the at least two materials according to the at least one item of blending information onto at least one substrate. In particular, the printer may be configured for blending the at least two materials according to the item of blending information, thereby e.g. generating the blend, onto a substrate for receiving the blend. The substrate may specifically be or may comprise at least one carrier medium, such as a carrier medium selected from the group consisting of: a glass carrier, such as a glass plate or a glass sheet; a plastic carrier, such as a plastic plate or a plastic sheet; a paper carrier, such as a paper sheet; a canvas. Other substrates may be feasible. As an example, the substrate may be a part of the printer itself or may be embedded within the printer. In particular, the substrate comprised by the printer may be a reusable carrier medium, such as a medium having a cleanable surface, e.g. a drum of the printer, for example a rotating drum.

The printer may further be configured for blending the at least two materials such that at least one pattern, specifically at least one interference pattern, is generated. The at least two materials to be blended by the printer may in particular be different materials, specifically materials being different with respect to at least one property. As an example, the at least two materials to be blended by the printer may differ in at least one property selected from the group consisting of: a chemical property, specifically a chemical composition; an optical property, specifically an optical appearance such as one or more of a color, a transparency, a brilliance; a mechanical property, specifically one or more of granularity, particle size, density, viscosity or flowing properties; an electrostatic chargeability; a compressibility; a crystallinity; a particle shape.

The method may comprise transforming the detected material property into color values of pixels for generating the mining digital image. The transforming may be performed by using at least one data processing device configured for applying at least one transformation algorithm to the material property. The transforming of the at least one material property into color values may take place in a computer-implemented fashion. Thus, the transforming of the at least one material property into the color values takes place by using at least one data processing device configured for applying the at least one transformation algorithm to the material property. The term "data processing device" as used herein is a broad term and is to be given its ordinary and customary meaning to a person of ordinary skill in the art and is not to be limited to a special or customized meaning. The term specifically may refer, without limitation, to a computer or a computer system, having at least one processor and optionally having at least one data storage device. Therein, the processor, as an example, may comprise at least one integrated circuit configured for executing computer readable instructions. The processor, additionally or alternatively, may also be or may comprise at least one application-specific integrated circuit and/or at least one field-programmable gate array. The configuration of the data processing device for applying the at least one transformation algorithm, as an example, may be performed by providing a plurality of computer-readable instructions to the data processing device, e.g. via at least one data storage device and/or via at least one interface.

The term "processor", also denoted as processing device, as used herein is a broad term and is to be given its ordinary and customary meaning to a person of ordinary skill in the art and is not to be limited to a special or customized meaning. The term specifically may refer, without limitation, to an arbitrary logic circuitry configured for performing basic operations of an electronic device or system, and/or, generally, to a device which is configured for performing calculations or logic operations. In particular, the processor may be configured for processing basic instructions that drive the device or system, such as a computer. As an example, the processor may comprise at least one arithmetic logic unit (ALU), at least one floating-point unit (FPU), such as a math coprocessor or a numeric coprocessor, a plurality of registers, specifically registers configured for supplying operands to the ALU and storing results of operations, and a memory, such as an L1 and L2 cache memory.

The term "algorithm" as used herein is a broad term and is to be given its ordinary and customary meaning to a person of ordinary skill in the art and is not to be limited to a special or customized meaning. The term specifically may refer, without limitation, to a plurality of process steps to be performed subsequently and/or in parallel. The algorithm specifically may comprise one or more mathematical operations to be applied to at least one input variable. Consequently, the term "transformation algorithm" specifically may refer to an algorithm which performs a transforming process for transforming the material property into color values by using one or more mathematical operations to be applied to the at least one input variable. The transformation of the material property into color values may take place in a single step or in a plurality of steps.

The transforming of the material property into color values may comprise subjecting the at least one material property to at least one test, specifically to at least one predetermined test. The at least one test may be or may comprise comparing the at least one material property directly or indirectly, such as by using the at least one item of measurement information, with at least one comparison value, at least one comparison value range or the like. Other mathematical tests are generally feasible and may also be applied. In accordance with the result of the at least one test, the RGB values may be generated. The transforming of the material property into color values specifically may comprise comparing the at least one material property, including the option of using the at least one item of measurement information representing the material property, with at least one threshold value. In accordance with the result of this comparison, for each primary color at least one number may be assigned to the material property.

Preferably, the mining digital image may be generated by scanning, in particular digital scanning, the blend, or at least a region of interest of the blend. The digital scanning may be performed using at least one scanning device. The term "scanning device" as used herein is a broad term and is to be given its ordinary and customary meaning to a person of ordinary skill in the art and is not to be limited to a special or customized meaning. The term specifically may refer, without limitation, to a device configured for detecting at least one property of at least one object and/or element, e.g. of the blend. In particular, the scanning device may be configured for examining and/or detecting at least one material property of the blend. As an example, the scanning device may have at least one scanning element configured for optically recording and/or capturing spatially resolved one-dimensional, two-dimensional or even three-dimensional optical information on the blend. Thus, e.g. for optical detection, the scanning device may, for example, comprise at least one sensor, such as optical sensors, specifically image sensors, e.g. at least one light sensitive capacitor, at least one charge-coupled device (CCD). The scanning device may for example comprise at least one CCD-chip and/or at least one CMOS chip. Specifically, the scanning device may be configured for detecting optical signals of the blend, e.g. of the blended and/or merged powder components, such as by using an optical system. In particular, the scanning system may be configured for convert, e.g. break down, the optical signals of the blend into primary colors, such as into red, green and blue, e.g. by using a prism. The scanning device may specifically be configured for converting the optical signals, such as the optical signals converted into primary colors, into at least one digital image, e.g. by using at least one sensor, such as a sensor comprising a plurality of light-sensitive capacitors. Further, the scanning device may comprise at least one illuminating element, such as an element configured for illuminating the blend, wherein the scanning device may be configured for detecting the at least one property of the blend by using a reflection of the blend. Herein, the scanning device may also be referred to as scanner. The scanning device may specifically be or may comprise a device selected from the group consisting of: a CCD scanner; a CIS scanner; a camera; a film. In particular, the scanning device may comprise at least one optical detection system, specifically comprising one or more of an optical detector, an image sensor, for example a photomultiplier tube (PMT), e.g. a vacuum tube converting incident photons into an electric signal, a silicon photomultiplier (SiPM), e.g. a solid-state device converting incident photons into an electric signal. The scanning device may specifically comprise at least one processor, wherein the processor may be configured for controlling at least one scanning operation of the scanning device.

Scanning may for example be performed using light of a wavelength at scanning in the range of from 10 nm to 1 mm, preferably in the range of from 300 nm to 800 nm. The luminous intensity per $m^2$ of the light used preferably is in the range of from 0.001 $lm/m^2$ and 10000000 $lm/m^2$, more preferable in the range of from 10 $lm/m^2$ and 1000000 $lm/m^2$.

The method comprises comparing the colored pixels of the mining digital image and the task digital image by using at least one processing device. The comparing of the colored pixels of the mining digital image and the task digital image may be performed pixelwise. The method may comprises pixelating the mining digital image. The pixelating may comprise dividing the mining digital image into pixels, in particular in a pre-defined number of pixels. For example, the pre-defined number of pixels may correspond to the number of pixels of the task digital image. For example, the pre-defined number of pixels may depend on mining difficulty.

The method may comprise determining a color code of the pixelated mining digital image by converting the colored pixels to, e.g. hexadecimal or binary, numerals. For example, the conversion of the color values into hexadecimal numerals may be performed using at least one mathematical algorithm and/or at least one pre-determined relationship such as a look-up table, e.g. as described in www.farben-umrechnen.de or "The Image-Interface: Graphical Supports for Visual Information", Everardo Reyes-Garcia, John Wiley & Sons, 2017, ISBN 978-1-1194-7497-5. The hexadecimal numerals may be further converted into the binary code of the mining digital image, for example, by using at least one mathematical algorithm and/or at least one pre-determined relationship such as a look-up table, e.g. as described in "Improving Image Performance by Using Color Lookup Tables, Adobe developer support, Technical Note #5121, 31 Mar. 1992 or https://www.rgbtohex.net/hextorgb/.

The comparing of the colored pixels of the mining digital image and the task digital image may comprise comparing color codes of the pixelated mining digital image and the task digital image. The comparing may comprise determining if the mining digital image and the task digital image are identical at least within a pre-defined pixel color tolerance range. The mining digital image and the task digital image may be considered identical within the pixel color error tolerance range of ±30% for each of the RGB color of a pixel, preferably of ±10% for each of the RGB colors of a pixel, more preferably of ±3% for each of the RGB colors of a pixel. Additionally or alternatively, an overall matching of the mining digital image and the task digital image may be determined. The mining digital image and the task digital image may be considered identical within an overall error tolerance range 30% of deviating pixels, preferably of 10% of deviating pixels, more preferably 3% of deviating pixels. The comparing may be performed by a processing device of the node, e.g. of the printing device.

The method may comprise determining by the other nodes of the network if the mining digital image and the task digital image are identical at least within a pre-defined tolerance range. The pixel color error tolerance range of the node performing the method may be tighter in comparison to the pre-defined tolerance range of the other nodes. This may allow ensuring that verifying of the found mining printer control setting is correct within a tolerance range is possible by each of the other nodes even if the printing device has a deviating accuracy.

The binary code of the mining printer control setting, may be applied to generate a nonce for generating and validating the block of the blockchain. A size of the nonce is may be set by the size of the binary code of the mining printer control setting. The size of nonce may be derived from a ratio of a number of pixel of the initial digital image and of number of pixel per same printer control setting. The term "nonce", as used herein is a broad term and is to be given its ordinary and customary meaning to a person of ordinary skill in the art and is not to be limited to a special or customized meaning. The term specifically may refer, without limitation, to an arbitrary number that can only be used once (1-dimensional).

The method may allow adjusting the time to protocol of the transactions in each block. The method may be performed with different and/or adjustable mining difficulty. The mining difficulty may be adjustable by one or more of the following variables: amount of pigment colors, size of initial image, size of task digital image, number of pixels per same printer control setting, pixel color error tolerance (e.g., red±10%), overall error tolerance (10 of 100 pixel are wrong), rastering, tilting, Moiré-effect. The time of each block can vary between 0.001 seconds and 10 hours, preferably between 1 second and 1 hour.

The method may comprise at least one calibration. A plurality of pre-specified color fields, such as primary colors of a used color space, may be provided in addition to the initial digital image and the task digital image and printed with the mining digital image. This may allow calibration of the scanning result.

As outlined above, the method for proof-of-work as disclosed herein may fully or partially be computer-implemented by at least one computer or computer network. Steps i) to iv) may also be partially computer-implemented or computer-supported. Consequently, the invention also discloses a computer program and a computer program product having program code means, in order to fully or partially perform or support the method for proof-of-work according to the present invention in one or more of the embodiments enclosed herein when the computer program product or the computer program is executed on a computer or computer network. Specifically, the program code means may be stored on a computer-readable data carrier and/or on a computer-readable storage medium. As used herein, the terms "computer-readable data carrier" and "computer-readable storage medium" specifically may refer to non-transitory data storage means, such as a hardware storage medium having stored thereon computer-executable instructions. The computer-readable data carrier or storage medium specifically may be or may comprise a storage medium such as a random-access memory (RAM) and/or a read-only memory (ROM).

In a further aspect of the present invention, a computer implemented method for proof-of-work for generating and validating a block of a blockchain using at least one printing device is disclosed. The printing device is configured for generating at least one digital image depending on a printer control setting. With respect to embodiments of the printing device reference is made to the method described in a first aspect of the present invention.

The method comprises the following method steps which, specifically, may be performed in the given order. Still, a different order is also possible. It is further possible to perform two or more of the method steps fully or partially simultaneously. Further, one or more or even all of the method steps may be performed once or may be performed repeatedly, such as repeated once or several times. Further, the method may comprise additional method steps which are not listed.

The method comprises the following steps:
a) providing a task digital image comprising a plurality of colored pixels and a task printer control setting used for generating the task digital image;
b) selecting a mining initial digital image having a plurality of colored pixels different from the task digital image, printing the mining initial digital image by using the printing device by blending pigments with the task printer control setting and scanning the printed image by using at least one scanning device, thereby generating a mining task digital image;
c) comparing the colored pixels of the mining task digital image and the task digital image by using at least one processing device;
wherein the method comprises repeating steps a) to c) until the colored pixels of the mining task digital image and the task digital image are found to be identical, wherein in each case in step c) a different mining initial digital image is selected, wherein the mining initial digital image for which the mining task digital image and the task digital image are found to be identical is used as the proof-of-work for generating and validating the block of the blockchain.

With respect to definitions and embodiments reference is made to the method described in a first aspect of the present invention with the difference, that in this case the task digital image and the task printer control setting are given and the initial digital image, therefore denoted with prefix "mining", is searched for proof-of-work.

The mining task digital image and the task digital image may be considered identical within a pixel color error tolerance range of ±30% for each of the RGB colors of a pixel, preferably of ±10% for each of the RGB colors of a pixel, more preferably of ±3% for each of the RGB colors of a pixel. The mining task digital image and the task digital image may be considered identical within an overall error tolerance range 30% of deviating pixels, preferably of 10% of deviating pixels, more preferably 3% of deviating pixels.

As outlined above, the method for proof-of-work of the further aspect as disclosed herein may fully or partially be computer-implemented by at least one computer or computer network. Steps a) to c) may also be partially computer-implemented or computer-supported. Consequently, the invention also discloses a computer program and a computer program product having program code means, in order to fully or partially perform or support the method for proof-of-work according to the present invention in one or more of the embodiments enclosed herein when the computer program product or the computer program is executed on a computer or computer network. Specifically, the program code means may be stored on a computer-readable data carrier and/or on a computer-readable storage medium.

In a further aspect of the present invention, a blockchain based on digital images is disclosed. The blockchain comprises a plurality of linked blocks. The blockchain is generated by using one of the methods for proof-of-work according to the present invention as described above or as described in more detail below. Thus, for definitions and embodiments reference is made to the description the method for proof-of-work.

In a further aspect use of a computer implemented method for proof-of-work according to any one of the preceding claims, for a purpose of mining for trading crypto currency, secured processing of transactions in the fields of smart contracts, financial services, healthcare, person-al identification, cryptocurrencies, supply chain is disclosed. Other applications are possible.

Summarizing and without excluding further possible embodiments, the following embodiments may be envisaged:

Embodiment 1 Computer implemented method for proof-of-work for generating and validating a block of a blockchain using at least one printing device, wherein the printing device is configured for generating at least one digital image depending on a printer control setting, the method comprises the following steps:
  i) providing an initial digital image comprising a plurality of colored pixels, wherein the initial digital image is taken from an image database and/or is generated by printing and scanning the initial digital image by using an initial printer control setting;
  ii) providing a task digital image comprising a plurality of colored pixels different from the initial digital image;
  iii) selecting a mining printer control setting, printing the initial digital image by using the printing device by blending pigments with the selected mining printer control setting and scanning the printed image by using at least one scanning device, thereby generating a mining digital image having a plurality of colored pixels different from the initial digital image;
  iv) comparing the colored pixels of the mining digital image and the task digital image by using at least one processing device;
  wherein the method comprises repeating steps ii) to iv) until the colored pixels of the mining digital image and the task digital image are found to be identical, wherein in each case in step iii) a different mining printer control setting is selected, wherein the mining printer control setting for which the mining digital image and the task digital image are found to be identical is used as the proof-of-work for generating and validating the block of the blockchain.

Embodiment 2 The method according to the preceding embodiment, wherein the binary code of the mining printer control setting is used to generate a number string to be applied as nonce for generating and validating the block of the blockchain, wherein a size of the nonce is set by the size of the binary code of the mining printer control setting, wherein the size of nonce is derived from a ratio of number of pixel of initial digital image and of number of pixel per same printer control setting.

Embodiment 3 The method according to any one of the preceding embodiments, wherein blending comprises at least one process of mixing pigments in a defined manner, thereby creating a blend.

Embodiment 4 The method according to the preceding embodiment, wherein the blending comprises further steps such as temperature changes or temperature treatments of the pigments.

Embodiment 5 The method according to any one of the preceding embodiments, wherein the pigments are selected from natural organic materials and from synthetic organic materials.

Embodiment 6 The method according to any one of the preceding embodiments, wherein the pigments are selected from inorganic materials, preferably from metal oxides, more preferably from iron oxides.

Embodiment 7 The method according to any one of the preceding embodiments, wherein the colored pixels of the initial digital image and/or the task digital image are colored pixels of CMYK color space, wherein the primary colors of the CMYK color space are black, cyan, magenta, yellow and white.

Embodiment 8 The method according to any one of the preceding embodiments, wherein the method comprises pixelating the mining digital image.

Embodiment 9 The method according to the preceding embodiment, wherein comparing of the colored pixels of the mining digital image and the task digital image is performed pixelwise.

Embodiment 10 The method according to any one of the two preceding embodiments, wherein the method comprises determining a color code of the pixelated mining digital image by converting the colored pixels to numerals, wherein comparing of the colored pixels of the mining digital image and the task digital image comprises comparing color codes of the pixelated mining digital image and the task digital image.

Embodiment 11 The method according to any one of the three preceding embodiments, wherein the mining digital image and the task digital image are considered identical within a pixel color error tolerance range of ±30% for each of the RGB colors of a pixel, preferably of ±10% for each of the RGB colors of a pixel, more preferably of ±3% for each of the RGB colors of a pixel.

Embodiment 12 The method according to any one of the three preceding embodiments, wherein the mining digital image and the task digital image are considered identical within an overall error tolerance range 30% of deviating pixels, preferably of 10% of deviating pixels, more preferably 3% of deviating pixels.

Embodiment 13 The method according to any one of the preceding embodiments, wherein the mining printer control setting is selected iteratively.

Embodiment 14 The method according to any one of the preceding embodiments, wherein the mining printer control setting is selected by one or more of at least one cloud service, at least one processing device of a node of a blockchain network.

Embodiment 15 The method according to any one of the preceding embodiments, wherein step i) comprises sizing and/or tilting the initial digital image with respect to size and/or tilt of the task digital image.

Embodiment 16 Computer implemented method for proof-of-work for generating and validating a block of a blockchain using at least one printing device, wherein the printing device is configured for generating at least one digital image depending on a printer control setting, the method comprises the following steps:
  a) providing a task digital image comprising a plurality of colored pixels and a task printer control setting used for generating the task digital image;
  b) selecting a mining initial digital image having a plurality of colored pixels different from the task digital image, printing the mining initial digital image by using the printing device by blending pigments with the task printer control setting and scanning the printed image by using at least one scanning device, thereby generating a mining task digital image;
  c) comparing the colored pixels of the mining task digital image and the task digital image by using at least one processing device;

wherein the method comprises repeating steps a) to c) until the colored pixels of the mining task digital image and the task digital image are found to be identical, wherein in each case in step c) a different mining initial digital image is selected, wherein the mining initial digital image for which the mining task digital image and the task digital image are found to be identical is used as the proof-of-work for generating and validating the block of the blockchain.

Embodiment 17 Use of a computer implemented method for proof-of-work according to any one of the preceding embodiments referring to a method, for a purpose of mining for trading crypto currency, secured processing of transactions in the fields of smart contracts, financial services, healthcare, person-al identification, cryptocurrencies, supply chain.

SHORT DESCRIPTION OF THE FIGURES

Further optional features and embodiments will be disclosed in more detail in the subsequent description of embodiments, preferably in conjunction with the dependent claims. Therein, the respective optional features may be realized in an isolated fashion as well as in any arbitrary feasible combination, as the skilled person will realize. The scope of the invention is not restricted by the preferred embodiments. The embodiments are schematically depicted in the Figures. Therein, identical reference numbers in these Figures refer to identical or functionally comparable elements.

DETAILED DESCRIPTION OF THE EMBODIMENTS

Figure 1:
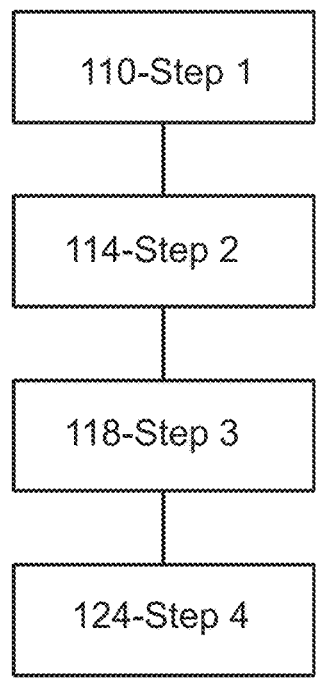
FIG. 1 show an embodiment of a method for proof of work.

In FIG. 1 a schematic illustration of an embodiment of a computer implemented method for proof-of-work for generating and validating a block of a blockchain using at least one printing device is shown. The printing device is configured for generating at least one digital image depending on a printer control setting.

The method comprises the following steps:
i) (denoted with reference number 110) providing an initial digital image 112 comprising a plurality of colored pixels, wherein the initial digital image 112 is taken from an image database and/or is generated by printing and scanning the initial digital image by using an initial printer control setting;
ii) (denoted with reference number 114) providing a task digital image 116 comprising a plurality of colored pixels different from the initial digital image 112;
iii) (denoted with reference number 118) selecting a mining printer control setting 120, printing the initial digital image 112 by using the printing device by blending pigments with the selected mining printer control setting 120 and scanning the printed image by using at least one scanning device, thereby generating a mining digital image 122 having a plurality of colored pixels different from the initial digital image 112;
iv) (denoted with reference number 124) comparing the colored pixels of the mining digital image 122 and the task digital image 116 by using at least one processing device;

wherein the method comprises repeating steps ii) to iv) until the colored pixels of the mining digital image 122 and the task digital image 116 are found to be identical, wherein in each case in step iii) a different mining printer control setting 120 is selected, wherein the mining printer control setting 120 for which the mining digital image 122 and the task digital image 116 are found to be identical is used as the proof-of-work for generating and validating the block of the blockchain.

The printer control setting may be printer control information comprising a plurality of parameters for controlling at least one function of the printing device. For example, the printer control setting may comprise a string of characters of a pre-defined length. The printer control setting may comprise at least one item of blending information, which will be outlined in more detail below. Thus, typically, the printing device may be configured for generating text and/or images on the at least one printing surface according to the printer control setting, such as one or more of a string of characters, a bitmapped image, a vector image, a computer program, e.g. provided in at least one printer control language. In particular, the printing device, specifically at least one function of the printing device, may be controllable via at least one printer control language, such as one or more page description languages (PDLs), printer command languages (PCLs), PostScript, XML Paper Specification and the like.

The generating at least one digital image may comprise blending pigments, in particular colored pigments, based on the printer control setting by using the printing device and scanning the blended pigments, in particular by using at least one scanning device such as of the printing device. With respect to embodiments of the printing device and the blending reference is made to WO 2021/001147, the full content is included herein by reference. The present invention takes the advantage of using the high entropy of solid particle bulks when they are blended. Especially, applying colored pigments for performing the blending of solid particle bulks, was found as effective way to analyze the physical results due the optical principle. Especially, the most significant part of energy consumption for the "proof-of-work" is proposed to be transferred to the physical process of blending. Performed by and/or done in the printing device, the blending may require only a very small amount of energy. Hence, the mining process is transferred to printing, where the miner needs to find an individual printer control setting to generate a dedicated image for each block. The binary code of the printer control setting may be transferred into a decimal number string known as a nonce from the digital mining. Substituting the "proof-of-work" by blending of pigments in a printing device may reduce the electrical energy consumption, for example in case of using natural pigments by 99%, in comparison to publicly available data for the Bitcoin blockchain technology. Thus, the present invention may allow a significant contribution to reduce costs and $CO_2$ emission as most of the electrical energy is not from renewable sources.

Figure 2:
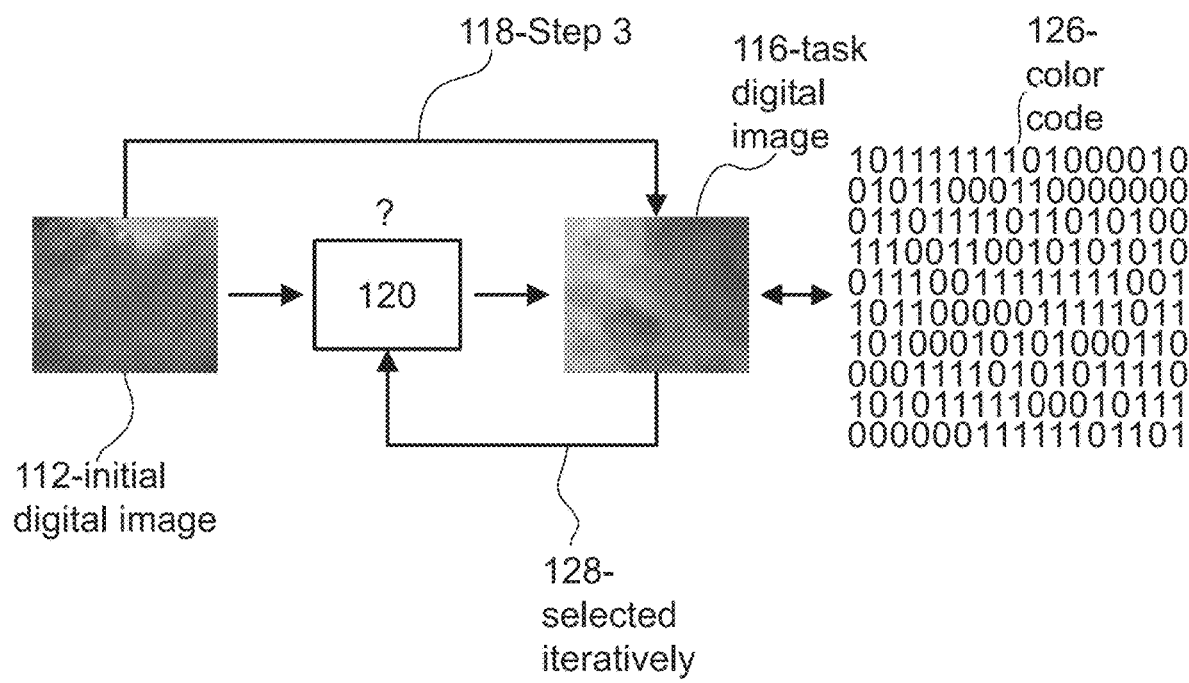
FIG. 2 shows a further illustration of the method for proof of work.

The method is further illustrated in FIG. 2. The initial digital image 112 may be used as a starting point for mining. The initial digital image may be taken from an image database and/or is generated by printing by using an initial printer control setting and scanning the initial digital image. The image database may be comprised by the printing device and/or may be an external database. The initial digital image 112 may be a task digital image or mining digital image used for generating and validating the previous block. The providing of the initial digital image 112 may comprise generating the initial digital image 112 or retrieving the initial digital image 112. The generating of the initial digital image 112 may comprise blending pigments, in particular colored pigments, based on an initial printer control setting by using the printing device and scanning the blended pigments, in particular by using at least one scanning device such as of the printing device. For example, the initial printer control setting may be the printer control setting used for generating and validating the previous block. Additionally or alternatively, the initial digital image 112 may be generated by digital scanning of a physical object. The physical object may be an arbitrary physical object. For example, the physical object may be a blend, a painting, a building, a plant and the like.

The task digital image 116 may be used as cryptographic puzzle. The task digital image 16 comprises a plurality of colored pixels different from the initial digital image 112. The task digital image 116 may be generated by using at least one random algorithm, such as by a random color code generator. In FIG. 2 exemplary a generated color code 126 is shown. Such random algorithms are generally known to the skilled person. Additionally or alternatively, the task digital image 116 may be provided by transforming digital information of transaction of a block, such as of the block to be added or of a previous block, e.g. in RGB colors or CMYK colors. The transaction may comprise financial transactions such as payments, licensing, orders, invoices, and/or logistic transactions such as deliveries, storage records, travel records, and/or transactions relating to plans, and/or tax declarations, and/or contracts, and/or personal health information and the like. The digital information of transaction may be transaction data describing at least one transaction. The transaction data may comprise information about one or more of time of transaction, a numerical value of the transaction a text of the transaction, a digital picture of the transaction, a text of the transaction, a digital image of the transaction and the like. The transaction data may be provided in binary format.

The colored pixels of the initial digital image 112 and/or the task digital image 116 may be colored pixels of CMYK color space, wherein the primary colors of the CMYK color space are black, cyan, magenta, yellow and white. However, other color spaces such as RGB may be possible.

Figure 3:
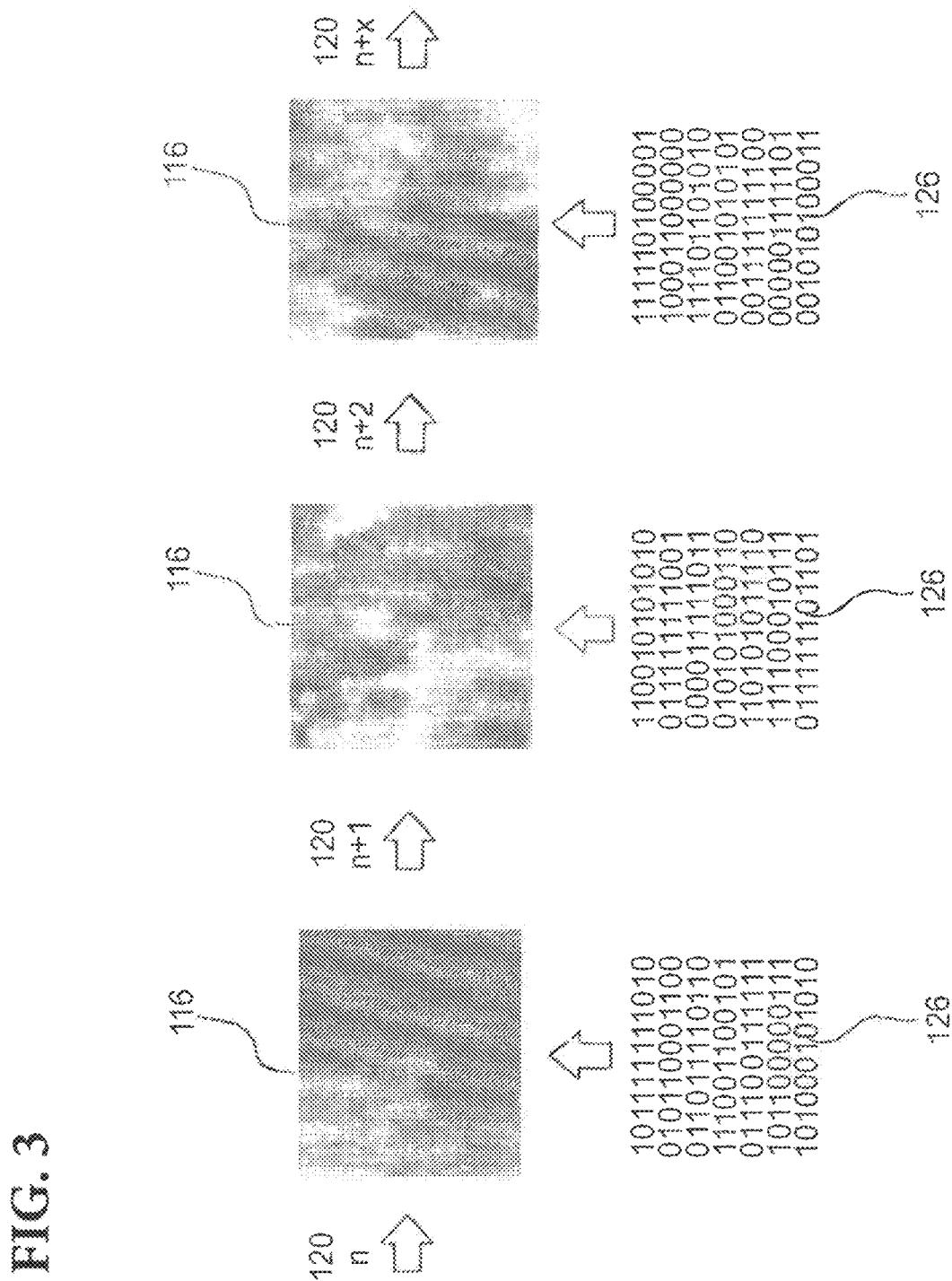
FIG. 3 shows an embodiment of method step ii) for generating new blocks of the blockchain.

FIG. 3 shows an embodiment of method step ii) comprising providing a task digital image for generating new blocks of the blockchain. For example, the blockchain may comprise a plurality of blocks n to n+X with X being a positive integer and X>n. Each time for generating a new block a new task digital image 116 is required, wherein the subsequent task digital image 116 has to be different from the preceding task digital images 116. In FIG. 3, exemplary three task digital images 116 are shown for three blocks. Each time the task digital image 116 may be generated by using the at least one random algorithm 126. The random numbers such as hexadecimal numbers generated by the random algorithm may be converted into color values. The conversion of the hexadecimal numerals into the color values may be performed using at least one mathematical algorithm and/or at least one pre-determined relationship such as a look-up table, e.g. as described in "Improving Image Performance by Using Color Lookup Tables, Adobe developer support, Technical Note #5121, 31 Mar. 1992 or https://www.rgbtohex.net/hextorgb/. In FIG. 2, exemplarily, three generated color codes 126 are shown which are converted into the respective task digital image 116. Additionally or alternatively, the task digital image 116 may be provided by transforming digital information of transaction of a block, such as of the block to be added or of a previous block, e.g. in RGB colors or CMYK colors. As further indicated with arrows 120n, 120n+1 and 120n+X in FIG. 3, the task digital image 116 of the previous block may be used as initial digital image 112 for proof-of-work for the next block.

Back to FIG. 2, the mining printer control setting 120 may be the printer control setting assumed to be used for generating the task digital image 116, which is denoted with the "?" in FIG. 2. The mining printer control setting 120 may be selected iteratively, in particular when repeating step iii) (denoted with arrow 128). For example, the mining printer control setting 120 may be selected to adjust the color pixelwise and/or for a group of pixels. For example, the mining printer control setting 120 may comprise a character string, wherein the characters of the character string, such as numbers, may be changed iteratively, e.g. the numbers of the character string may be incremented, such as by one, when selecting the next mining printer control setting 120. The mining printer control setting 120 may be selected by one or more of at least one cloud service, at least one processing device of a node of the blockchain network, or the like. For example, each of the nodes may be configured for execute a software program configured for selecting the mining printer control setting 120.

The mining digital image 122 may be generated by printing the initial digital image 112 by using the printing device by blending pigments with the selected mining printer control setting 120 and scanning the printed image by using at least one scanning device. The blending may comprise at least one process of mixing pigments in a defined manner, thereby creating a blend. The printing device may be configured for use as a blending device. Specifically, the printing device is configured for receiving the at least one item of blending information and for generating the digital image. The printing device may specifically be configured for blending at least two materials according to the at least one item of blending information onto at least one substrate. In particular, the printing device may be configured for blending the at least two materials according to the item of blending information, thereby e.g. generating the blend, onto a substrate for receiving the blend. With respect to embodiments of the printing device and the generating of the encryption key reference is made to WO 2021/001147, the full content is included herein by reference.

The method comprises comparing the colored pixels of the mining digital image 122 and the task digital image 116 by using at least one processing device. The comparing of the colored pixels of the mining digital image 122 and the task digital image 116 may be performed pixelwise. The method may comprises pixelating the mining digital image 122. The pixelating may comprise dividing the mining digital image 122 into pixels, in particular in a pre-defined number of pixels. For example, the pre-defined number of pixels may correspond to the number of pixels of the task digital image 116. For example, the pre-defined number of pixels may depend on mining difficulty.

The method may comprise determining a color code of the pixelated mining digital image 122 by converting the colored pixels to, e.g. hexadecimal or binary, numerals. For example, the conversion of the color values into hexadecimal numerals may be performed using at least one mathematical algorithm and/or at least one pre-determined relationship such as a look-up table, e.g. as described in www.farben-umrechnen.de or "The Image-Interface: Graphical Supports for Visual Information", Everardo Reyes-Garcia, John Wiley & Sons, 2017, ISBN 978-1-1194-7497-5. The hexadecimal numerals may be further converted into the binary code of the first digital RGB image, for example, by using at least one mathematical algorithm and/or at least one pre-determined relationship such as a look-up table, e.g. as described in "Improving Image Performance by Using Color Lookup Tables, Adobe developer support, Technical Note #5121, 31 Mar. 1992 or https://www.rgbtohex.net/hextorgb/.

The comparing of the colored pixels of the mining digital image 122 and the task digital image 116 may comprise comparing color codes of the pixelated mining digital image 122 and the task digital image 116. The comparing may comprise determining if the mining digital image 122 and the task digital image 116 are identical at least within a pre-defined pixel color tolerance range. The mining digital image 122 and the task digital image 116 may be considered identical within the pixel color error tolerance range of ±30% for each of the RGB colors of a pixel, preferably of ±10% for each of the RGB colors of a pixel, more preferably of ±3% for each of the RGB colors of a pixel. Additionally or alternatively, an overall matching of the mining digital image 122 and the task digital image 116 may be determined. The mining digital image 122 and the task digital image 116 may be considered identical within an overall error tolerance range 30% of deviating pixels, preferably of 10% of deviating pixels, more preferably 3% of deviating pixels. The comparing may be performed by a processing device of the node, e.g. of the printing device.

The method may comprise determining by the other nodes of the network if the mining digital image 122 and the task digital image 116 are identical at least within a pre-defined tolerance range. The pixel color error tolerance range of the node performing the method may be tighter in comparison to the pre-defined tolerance range of the other nodes. This may allow ensuring that verifying of the found mining printer control setting 120 is correct within a tolerance range is possible by each of the other nodes even if the printing device has a deviating accuracy.

Figure 4:
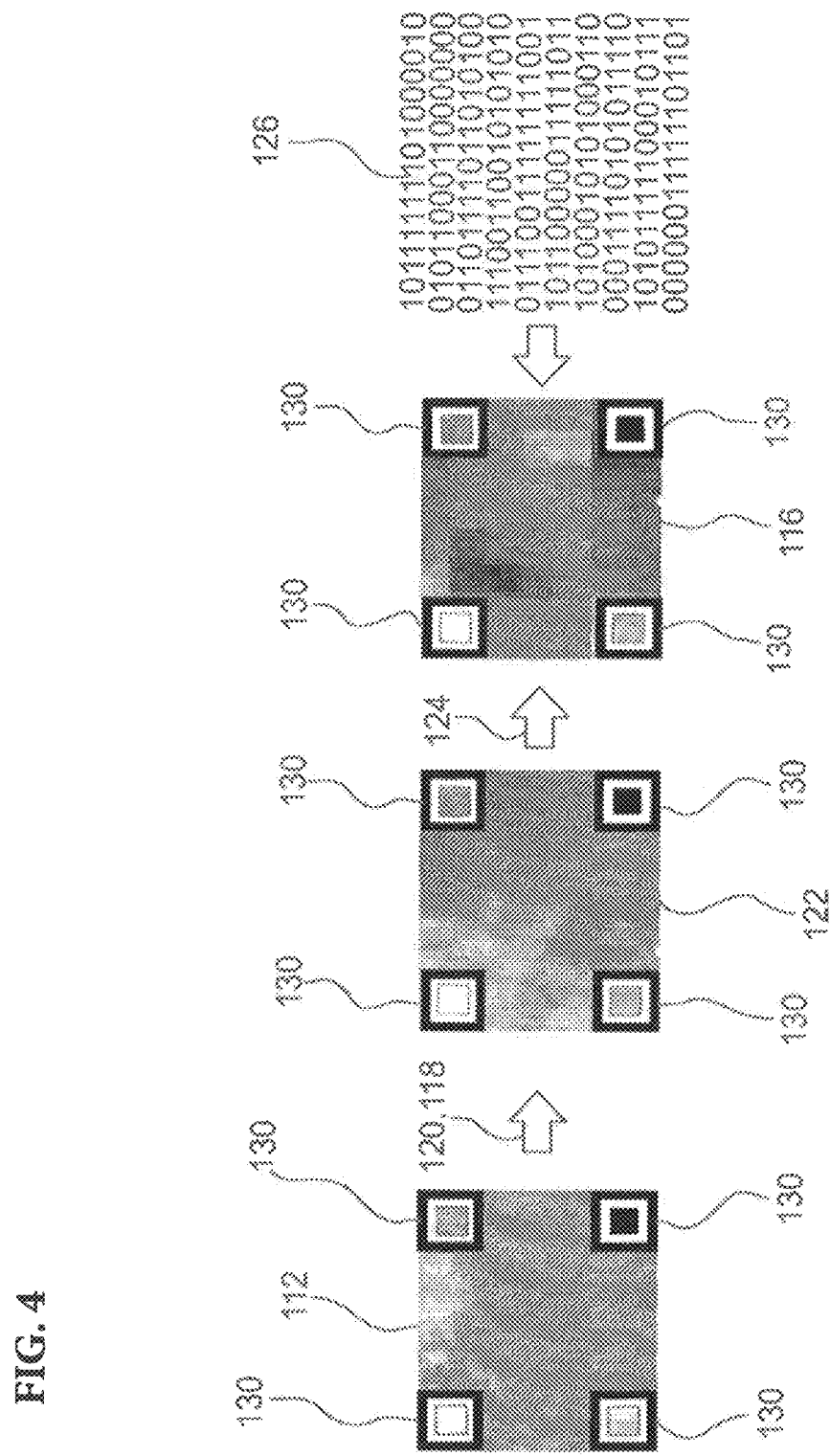
FIG. 4 shows a further embodiment of the method for proof-of-work of FIG. 1.

FIG. 4 shows a further embodiment of the method for proof-of-work of FIG. 1. Again, in the method the cryptography puzzle to solve is which is the printer control setting 120 to change the color code of the initial digital image 112 to the task digital image. From left to right in FIG. 4, the initial digital image 112 is provided. The initial digital image 112 may be printed by using the printing device by blending pigments with the selected mining printer control setting 120. The printed initial digital image 112 may be scanned by using the scanning device, thereby generating the mining digital image 122. Step iii) 124 may further comprise pixelating the mining digital image. As visualized in FIG. 4, the number of pixels of the mining digital image 122 and the task digital image 116 may be different. For example, the task digital image may have less pixels compared to the mining digital image 116. The pixelating of the mining digital image 122 may comprise grouping the pixels of the mining digital image to match the number of pixels of the task digital image 116. The mining digital image 122 is compared to the task digital image 116. The mining printer control setting 120 for which the mining digital image 122 and the task digital image 116 are found to be identical is used as the proof-of-work for generating and validating the block of the blockchain.

Further shown in FIG. 4 are pre-specified color fields 130 which can be used for calibration. In this example four pre-specified color fields 130 are shown which may be provided in addition to the initial digital image 112 and the task digital image 116 and may be printed with the mining digital image 122. This may allow calibration of the scanning result.

Figure 5:
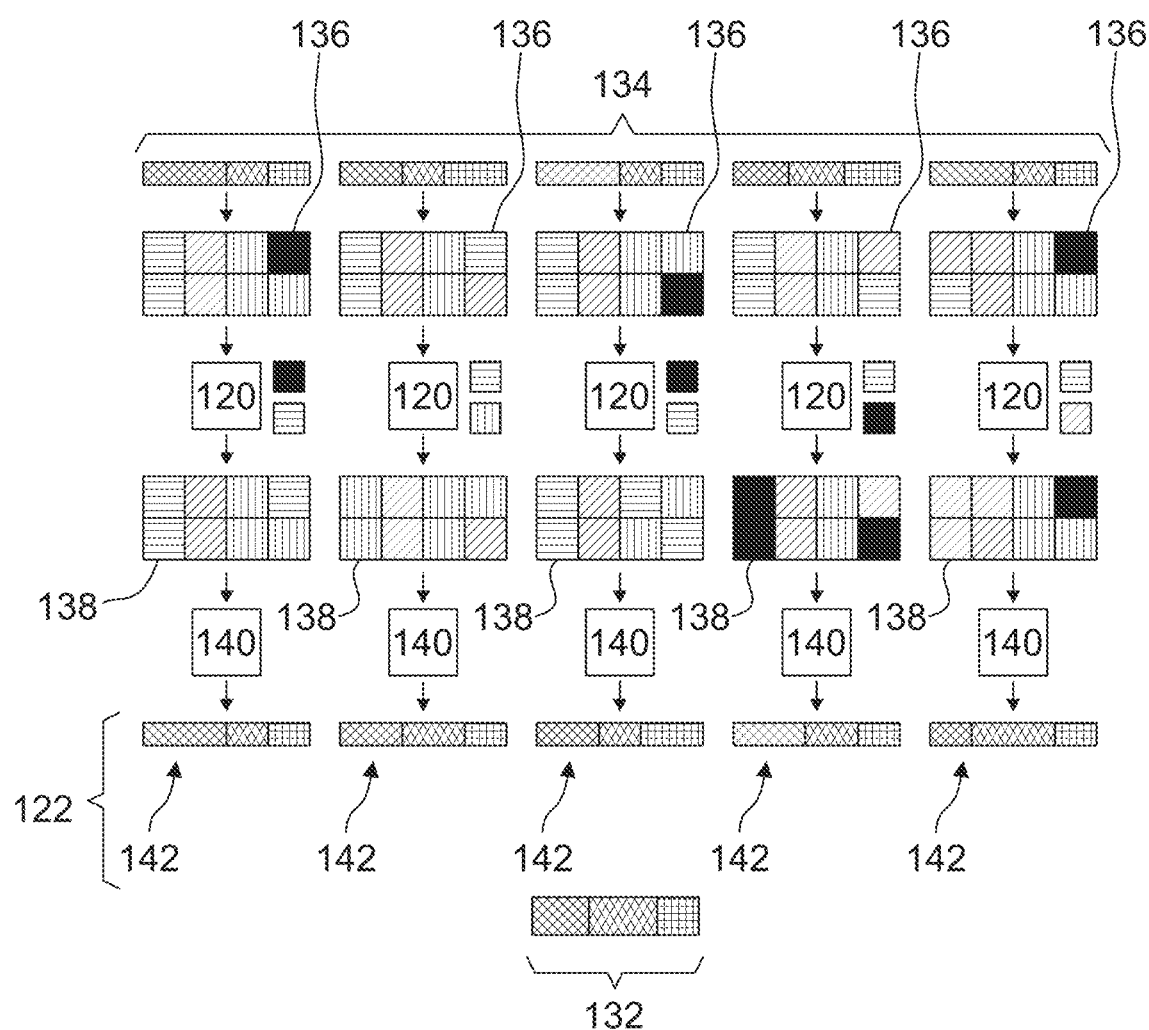
FIG. 5 shows an embodiment of generating of one pixel of the mining digital image.

FIG. 5 shows an embodiment of generating of one pixel 132 of the mining digital image 122, such as of an RGB pixel. The generating of the pixel 132 is describes as a flow chart from up to down. The initial digital image 112 may be provided from the image database. In FIG. 5 exemplarily the 5 pixels 134 of the initial digital image 112 are depicted which are used for generating the pixel 132 of the mining digital image 122. The pixels 134 may be RGB pixels. The RGB pixels 134 may be converted into CMYK color pixels 136. The CMYK color pixels 136 may be printed by blending pigments with the selected mining printer control setting 120. In FIG. 5, exemplarily, mining printer control settings 120 changing one color of the respective pixels into one other color are shown, e.g. from left to right in FIG. 5, from black to yellow, from yellow to cyan, from black to yellow, from yellow to black and from yellow to magenta. The printed pixels 138 of the initial digital image 112 are shown in the next row of FIG. 5. The printed pixels 138 may be scanned 140 by using the scanning device thereby generating pixels 142, in particular RGB pixels, of the mining digital image 122. The method, as shown in the next row of FIG. 5, may comprise pixelating the mining digital image 122 thereby generating the pixel 132 of the mining digital image 122.

Figure 6:
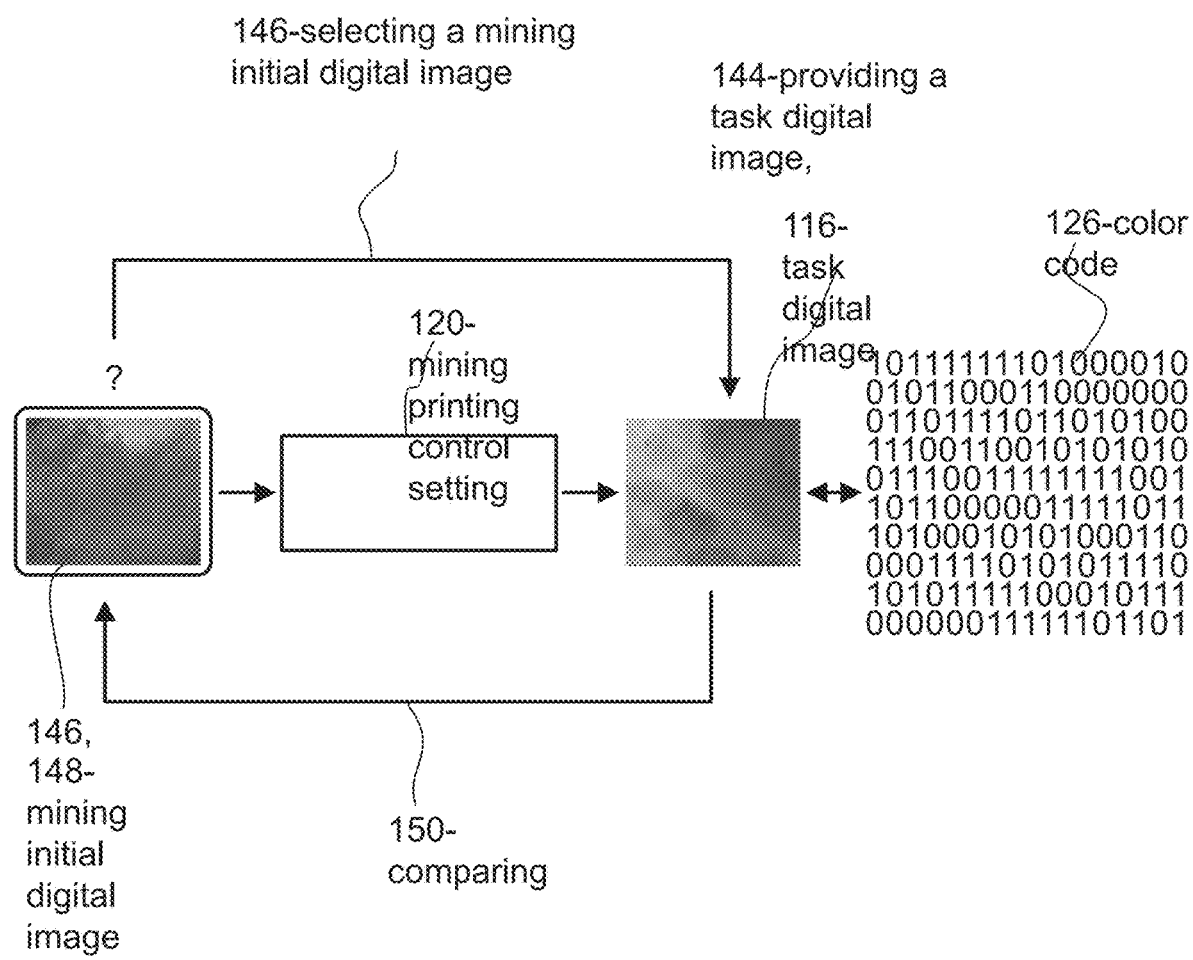
FIG. 6 shows a further illustration of a method for proof of work.

FIG. 6 shows a further illustration of a computer implemented method for proof-of-work for generating and validating a block of a blockchain using at least one printing device. The printing device is configured for generating at least one digital image depending on a printer control setting. The method comprises the following steps:

a) (reference number 144) providing a task digital image 116 comprising a plurality of colored pixels and a task printer control setting used for generating the task digital image 116;

b) (reference number 146) selecting a mining initial digital image 148 having a plurality of colored pixels different from the task digital image 116, printing the mining initial digital image 148 by using the printing device by blending pigments with the task printer control setting and scanning the printed image by using at least one scanning device, thereby generating a mining task digital image;

c) (reference number 150) comparing the colored pixels of the mining task digital image 148 and the task digital image 116 by using at least one processing device;

wherein the method comprises repeating steps a) to c) until the colored pixels of the mining task digital image 148 and the task digital image 116 are found to be identical, wherein in each case in step c) a different mining initial digital image 148 is selected, wherein the mining initial digital image 148 for which the mining task digital image 148 and the task digital image 116 are found to be identical is used as the proof-of-work for generating and validating the block of the blockchain.

LIST OF REFERENCE NUMBERS 110 step i)
112 initial digital image
114 step ii)
116 task digital image
118 step iii)
120 mining printer control setting
122 mining digital image
124 step iv)
126 color code
128 selected iteratively
130 pre-specified color field
132 one pixel of the mining digital image
134 5 pixels of the initial digital image
136 CMYK color pixels
138 printed pixels
140 scanning
142 pixel of the mining digital image
144 providing a task digital image
146 selecting a mining initial digital image
148 mining initial digital image
150 comparing

The invention claimed is:

1. Computer implemented method for proof-of-work for generating and validating a block of a blockchain using at least one printing device, wherein the printing device is configured for generating at least one digital image depending on a printer control setting, the method comprises the following steps:
  i) (110) providing an initial digital image (112) comprising a plurality of colored pixels, wherein the initial digital image (110) is taken from an image database and/or is generated by printing and scanning the initial digital image by using an initial printer control setting;
  ii) (114) providing a task digital image (116) comprising a plurality of colored pixels different from the initial digital image (112);
  iii) (118) selecting a mining printer control setting (120), printing the initial digital image (112) by using the printing device by blending pigments with the selected mining printer control setting (120) and scanning the printed image by using at least one scanning device, thereby generating a mining digital image (122) having a plurality of colored pixels different from the initial digital image (112);
  iv) (124) comparing the colored pixels of the mining digital image (122) and the task digital image (116) by using at least one processing device;
  wherein the method comprises repeating steps ii) (114) to iv) (124) until the colored pixels of the mining digital image (122) and the task digital image (116) are found to be identical, wherein in each case in step iii) (118) a different mining printer control setting (120) is selected, wherein the mining printer control setting (120) for which the mining digital image (122) and the task digital image (116) are found to be identical is used as the proof-of-work for generating and validating the block of the blockchain.

2. The method according to claim 1, wherein a binary information of mining printer control setting (120) is used to generate a number string to be applied as nonce for generating and validating the block of the blockchain.

3. The method according to claim 2, wherein a size of nonce is derived from the mining printer control setting, wherein the size of nonce is derived from a ratio of a number of pixel of the initial digital image (112) and of a number of pixel per same printer control setting.

4. The method according to claim 1, wherein blending comprises at least one process of mixing pigments in a defined manner, thereby creating a blend.

5. The method according to claim 4, wherein the blending comprises further steps such as temperature changes or temperature treatments of the pigments.

6. The method according to claim 1, wherein the pigments are selected from natural organic materials and from synthetic organic materials.

7. The method according to claim 1, wherein the pigments are selected from inorganic materials.

8. The method according to claim 1, wherein the method comprises pixelating the mining digital image (122).

9. The method according to claim 8, wherein comparing of the colored pixels of the mining digital image (122) and the task digital image (116) is performed pixelwise.

10. The method according to claim 1, wherein the method comprises determining a color code of the pixelated mining digital image (122) by converting the colored pixels to numerals, wherein comparing of the colored pixels of the mining digital image (122) and the task digital image (116) comprises comparing color codes of the pixelated mining digital image (122) and the task digital image (116).

11. The method according to claim 1, wherein the mining digital image (122) and the task digital image (116) are considered identical within a pixel color error tolerance range of ±30% for each of the RGB colors of a pixel.

12. The method according to claim 1, wherein the mining digital image (122) and the task digital image (116) are considered identical within an overall error tolerance range 10% of deviating pixels.

13. The method according to claim 1, wherein the mining printer control setting (120) is selected iteratively.

14. The method according to claim 1, wherein the mining printer control setting (120) is selected by one or more of at least one cloud service, at least one processing device of a node of a blockchain network.

15. The method according to claim 1, wherein step i) (110) comprises sizing and/or tilting the initial digital image (112) with respect to size and/or tilt of the task digital image (116).

16. Computer implemented method for proof-of-work for generating and validating a block of a blockchain using at least one printing device, wherein the printing device is configured for generating at least one digital image depending on a printer control setting, the method comprises the following steps:
  a) providing a task digital image (116) comprising a plurality of colored pixels and a task printer control setting used for generating the task digital image (116);
  b) selecting a mining initial digital image having a plurality of colored pixels different from the task digital image (116), printing the mining initial digital image by using the printing device by blending pigments with the task printer control setting and scanning the printed image by using at least one scanning device, thereby generating a mining task digital image;
  c) comparing the colored pixels of the mining task digital image and the task digital image by using at least one processing device;
  wherein the method comprises repeating steps a) to c) until the colored pixels of the mining task digital image and the task digital image (116) are found to be identical, wherein in each case in step c) a different mining initial digital image is selected, wherein the mining initial digital image for which the mining task digital image and the task digital image (116) are found to be identical is used as the proof-of-work for generating and validating the block of the blockchain.

17. A non-transient computer-readable medium including instructions that, when executed by one or more processors, cause the processor to perform the method according to claim 1.

* * * * *